United States Patent
Du (10) Patent No.: US 10,197,836 B2
(45) Date of Patent: Feb. 5, 2019

(54) SPLICED DISPLAY AND DISPLAY SYSTEM

(71) Applicant: Boe Technology Group Co., Ltd., Beijing (CN)

(72) Inventor: Zhihong Du, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 2 days.

(21) Appl. No.: 14/741,791

(22) Filed: Jun. 17, 2015

(65) Prior Publication Data

US 2016/0161784 A1 Jun. 9, 2016

(30) Foreign Application Priority Data

Dec. 9, 2014 (CN) .......................... 2014 1 0751508

(51) Int. Cl.
*G02F 1/1333* (2006.01)
*F16B 19/10* (2006.01)

(52) U.S. Cl.
CPC .... *G02F 1/13336* (2013.01); *G02F 1/133308* (2013.01); *G02F 2001/133325* (2013.01); *G02F 2201/46* (2013.01)

(58) Field of Classification Search
CPC ........... G02F 1/13336; G02F 2201/465; F16B 13/04; A44B 17/00
See application file for complete search history.

(56) References Cited

U.S. PATENT DOCUMENTS 4,405,272 A * 9/1983 Wollar ................ F16B 19/1081
411/41
6,418,267 B1 * 7/2002 Lowry ..................... G02B 6/06
385/115
8,154,864 B1 4/2012 Nearman et al.
2006/0198714 A1 * 9/2006 Lesecq ................ F16B 19/1081
411/44
2009/0310337 A1 * 12/2009 Patterson .............. G06F 3/1446
362/97.1

(Continued)

FOREIGN PATENT DOCUMENTS

| CN | 1828071 A | 9/2006 |
| CN | 201853441 | 6/2011 |
| CN | 202189513 | 4/2012 |

(Continued)

OTHER PUBLICATIONS

Office Action from China Application No. 201410751508.5 dated Dec. 7, 2016.

(Continued)

*Primary Examiner* — Edward Glick
*Assistant Examiner* — Anthony G Quash
(74) *Attorney, Agent, or Firm* — Calfee, Halter & Griswold LLP (57) ABSTRACT

The present disclosure relates to the technical field of display, particularly to a spliced display and a display system. The spliced display includes clips and a number of display modules. The display modules can be spliced into an image display area, and adjacent two display modules can be connected by clips. By connecting adjacent two display modules by clips into the spliced display, the assembling time can be reduced, the assembling process can be simplified, and this is advantageous to mass production of products.

10 Claims, 10 Drawing Sheets

(56) References Cited

U.S. PATENT DOCUMENTS

2010/0159160 A1\* 6/2010 Basile ................ G09F 15/0006
428/14

FOREIGN PATENT DOCUMENTS

| CN | 203230142 | | 10/2013 | | |
|---|---|---|---|---|---|
| CN | 203979025 | U | 12/2014 | | |
| JP | 2002106531 | A \* | 4/2002 | .............. | F16B 19/10 |
| JP | 2004028244 | A \* | 1/2004 | .............. | F16B 19/10 |

OTHER PUBLICATIONS

Third Office Action from China Application No. 201410751508.5 dated Oct. 13, 2017.
Second Office Action for Chinese Patent Application No. 201410751508.5 dated May 18, 2017.
Fourth Office Action from China Application No. 201410751508.5 dated Apr. 26, 2018.

\* cited by examiner

SPLICED DISPLAY AND DISPLAY SYSTEM

RELATED APPLICATIONS

The present application claims the benefit of Chinese Patent Application No. 201410751508.5, filed on Dec. 9, 2014, the entire disclosure of which is incorporated herein by reference.

BACKGROUND OF THE DISCLOSURE

1. Field of the Disclosure

The present disclosure relates to the technical field of display, in particular relates to a spliced display and a display system.

2. Description of the Prior Art

The spliced display is a kind of large screen display system with high brightness, high resolution, high definition, high intelligent control and advanced operation, which combines the international advanced ultra-narrow side liquid crystal display technique, television wall splicing technique, multi-screen image processing technique, network technique and the like. Such large screen display system can be well integrated with the user monitor system, the command and dispatch system, the network information system and the like, forming an interactive information display and management platform with perfect function and advanced technique. Currently, the existing spliced display has a plurality of individual display modules connected by screws. In the process of assembly, the technician first should drill a plurality of threaded holes in the display modules, and then lock each screw in each threaded hole by screwdriver respectively. The operation of the locking screw can be very tedious, and on-site assembly will consume a lot of time, which is adverse to the mass production of the products.

In light of the above mentioned disadvantages, therefore, there exists a need for a spliced display, and a display system which can save assembling time, simplify assembly process and is advantageous to the mass production of products.

SUMMARY OF THE DISCLOSURE

The technical problem to be solved by the present disclosure is to solve the problem that the operation of existing spliced display is too tedious, the assembling time is too long and is adverse to the mass production of the products.

In order to solve the above technical problem, the present disclosure provides a spliced display, comprising clips and a plurality of display modules, wherein the plurality of display modules are spliced into an image display area, and adjacent two display modules are connected by clips.

According to an aspect of the present disclosure, the clip comprises a base and jaws, wherein the jaws are located at the base; a fixture slot is located between the jaws and the base, which is used to engage adjacent two display modules.

According to an aspect of the present disclosure, the clip further comprises a pin and the base is provided with a through hole, and one end of the pin is inserted into the through hole.

According to an aspect of the present disclosure, the clip further comprises a stopper, which is connected with the pin and can be used to stop the jaws.

According to an aspect of the present disclosure, the number of the jaws is two.

According to an aspect of the present disclosure, wherein the clip comprises a base and a fixture block, wherein the fixture block is a solid structure and is located at the base; a fixture slot is located between the fixture block and the base, which is used to engage the adjacent two display modules.

According to an aspect of the present disclosure, a locating slot is located at the base.

According to an aspect of the present disclosure, the cross-section shape of the base is rectangular or circular or annular.

According to an aspect of the present disclosure, the display module comprises a transparent liquid crystal panel and a panel frame. The transparent liquid crystal panel is mounted on the panel frame. A locating hole is located in the panel frame to install the clip.

The present disclosure also provides a display system, which comprises the above described spliced displays.

The above mentioned technical solution has the following beneficial effects: by connecting adjacent two display modules by clips into the spliced display, the assembling time can be reduced, the assembling process can be simplified and this is advantageous to the mass production of the products.

DETAILED DESCRIPTION OF THE PRESENT DISCLOSURE

The implementation of the present disclosure will be described in more detail in conjunction with the drawings and embodiments. The following embodiments are used to illustrate the present disclosure, and will not be used to restrict the scope of the present disclosure.

In the description of the present disclosure, unless otherwise stated, "plurality" means two or more. The terms used herein to describing orientations or positional relationships such as "upper" and "lower", "left", and "right", "inside" and "outside", "front" and "rear", "head" and "tail" are based on the orientation or positional relationship illustrated in the drawings, which are only used for ease of description and simplicity of description, and not to suggest or imply that the mentioned devices or elements must adopt certain orientation, construct or operate with certain orientation, and thereby those terms will not restrict the present disclosure in this respect. Besides, terms such as "first", "second", "third" or the like are only used for the purpose of description, and should not be considered as to indicate or imply relative importance.

In present description, it should be noted that unless otherwise specified or restricted, the terms "mount", "connect", "couple" as used herein can be understood in broad sense, for example, it can be fixedly connected, or removably connected or integrally connected; It can be mechanically connected or electronically connected; it can be directly connected or can be connected through intermediate element. Those skilled the art of the present disclosure can understand the specific meanings of those terms according to actual situation.

Figure 1:
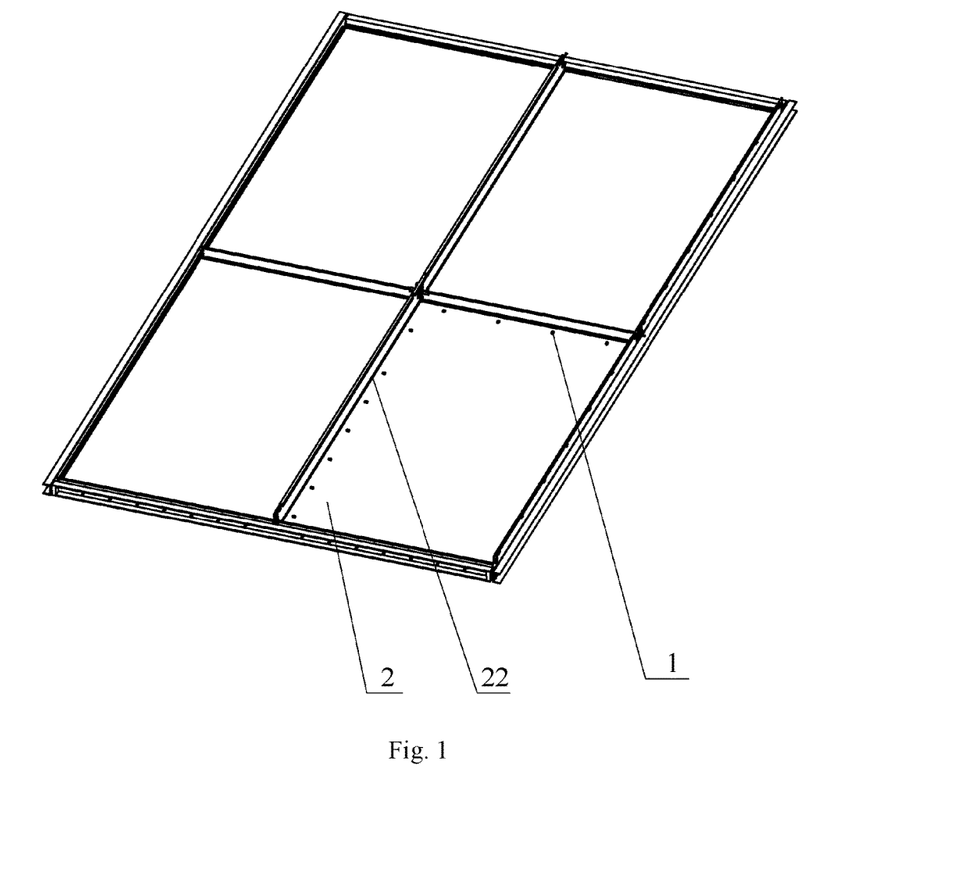
FIG. 1 is a schematic view showing the structure of a spliced display according to an embodiment of the present disclosure.

As shown in FIG. 1, the present embodiment provides a spliced display which comprises clips 1 and a plurality of display modules 2. The plurality of display modules 2 are spliced into an image display area. Adjacent two display modules 2 are connected by clips 1. By connecting adjacent two display modules 2 by clips 1 in the spliced display, the assembling time can be reduced, the assembling process can be simplified and this is advantageous to the mass production of such products, compared to the way of locking by screws in prior art.

It should be noted that the number, shape of the display module 2 is not limited to a certain number or shape; on the contrary it can be adjusted as required. For example, the number of the display modules 2 can be preferably 4, and the shape of the display modules 2 can be preferably rectangular. Of course, other number and shape of the display modules 2 are also within the protection scope of the present disclosure.

Furthermore, the display module 2 comprises a transparent liquid crystal panel and panel frame 22. The transparent liquid crystal panel is mounted on the panel frame 22. Locating holes 17 are located in the panel frame 22 for installing clips 1. When a plurality of display modules 2 are spliced, the clips 1 can be installed in the plurality of locating holes 17 at the adjacent panel frames 22, and the splicing of the display modules 2 can be executed.

Meanwhile, the clips 1 can take various forms which are within the protection scope of the present disclosure as long as they can engage the two display modules 2 together. The present disclosure will be illustrated by the following embodiments.

First Embodiment

Figure 2:
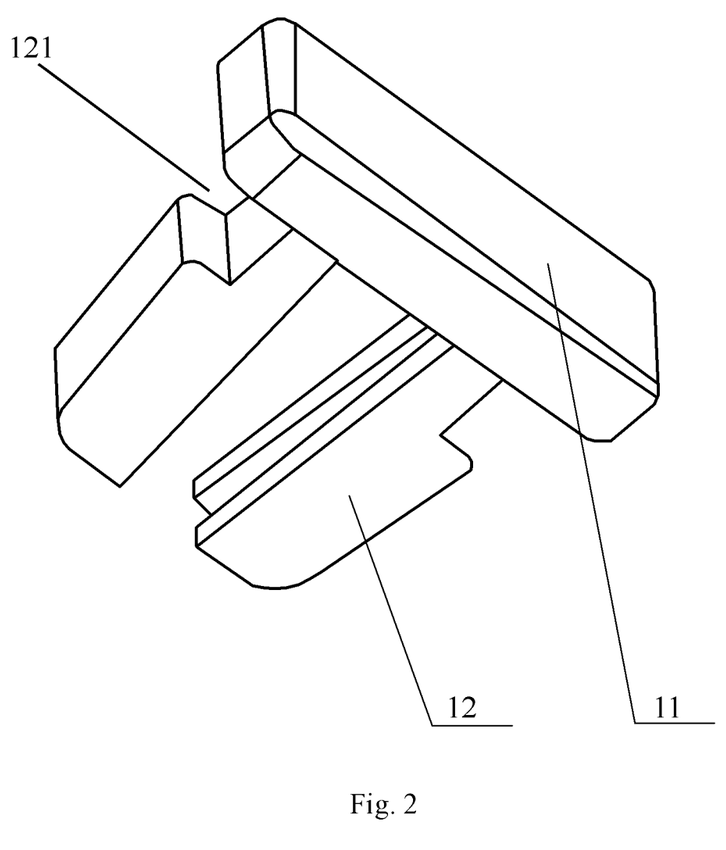
FIG. 2 is a schematic view showing the structure of a clip according to a first embodiment of the present disclosure.

As shown in FIG. 2, in the present embodiment, the clip 1 comprises a base 11 and jaws 12. The jaws 12 are located at the base 11, and there is a fixture slot between the base 11 and the jaws 12 which is used to engage adjacent two display modules 2. In the present embodiment, the base 11 is in the shape of cuboid. The jaws 12 are provided at one side of the base 11. The jaws 12 are two elastic hooks. Their specific shape is like letter L or J. However, they can take any shape as long as they have the structure that can be engaged in the locating hole 17.

Figure 7:
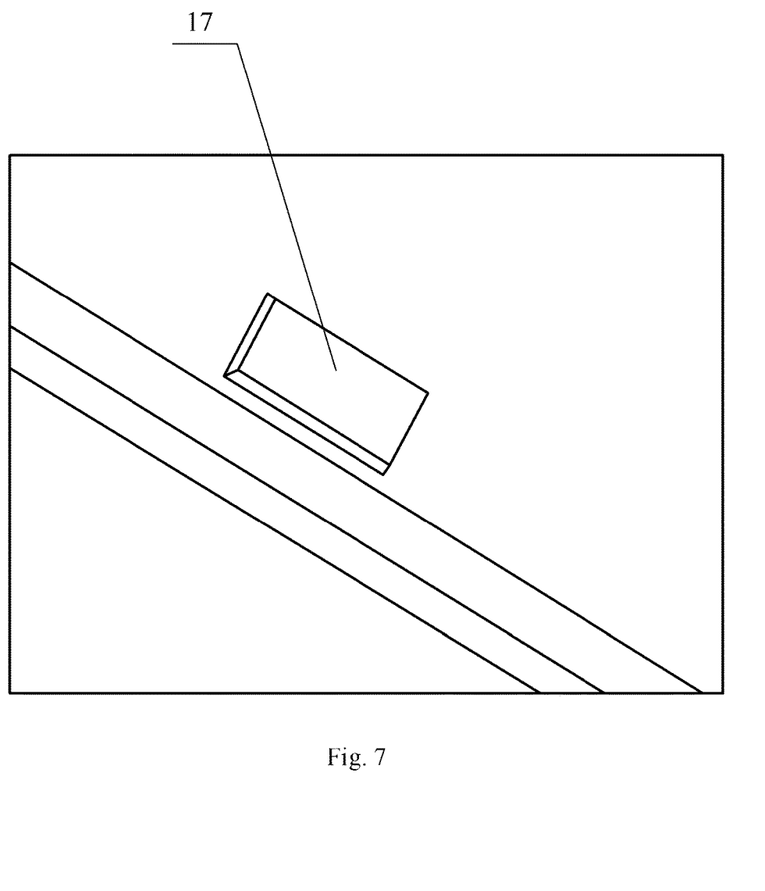
FIG. 7 is a schematic view showing the structure of a locating hole in the first embodiment of the present disclosure.

Accordingly, referring to FIG. 1 and FIG. 7, a plurality of locating holes 17 are spaced apart from each other in the panel frame 22 of the display module 2. The locating hole 17 is in the shape of a small rectangle corresponding to the shape of the base 11. When the clip 1 is installed at the two display modules 2, the base 11 is abutted against the opening of the locating hole 17 at one side. The jaws 12 can pass through the two locating holes 17 and engage at the opening of the locating hole 17 at the other side.

Second Embodiment

Figure 3:
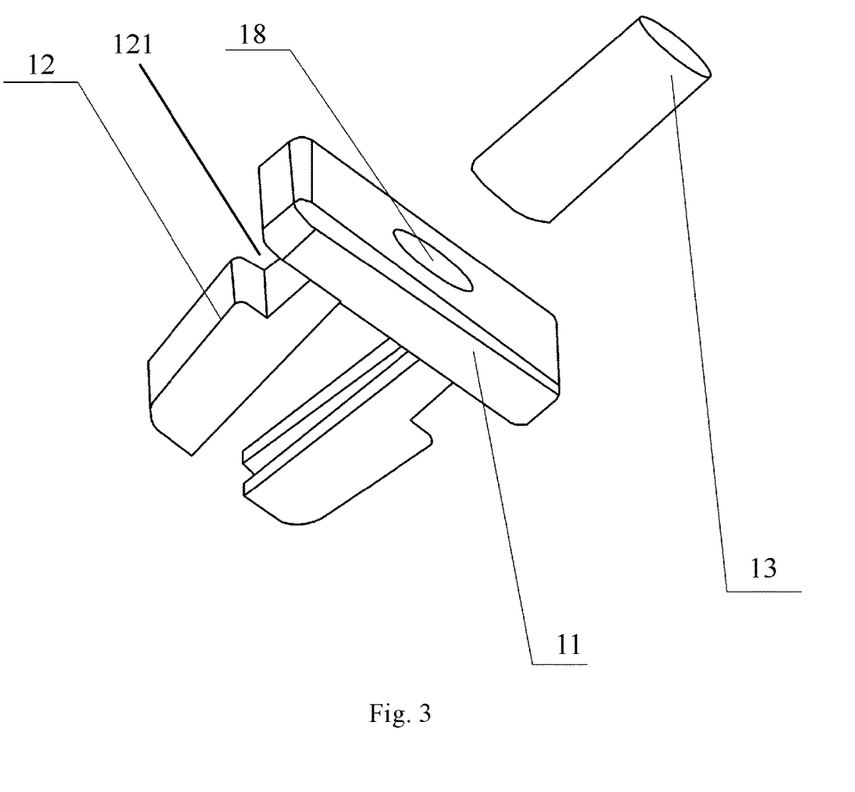
FIG. 3 is a schematic view showing the structure of a clip according to a second embodiment of the present disclosure.

Similar technical aspect of the second embodiment to the first embodiment will not be described in more detail herein. Some of the aspects of the first embodiment also belong to the aspects of the second embodiment. The difference between the first embodiment and the second embodiment is: a pin 13 is added to the first embodiment, which can effectively prevent the occurrence of rebound deformation of the clip 1.

As shown in FIG. 3, the clip 1 comprises a base 11, jaws 12 and a pin 13. The base is in the shape of cuboid. A through hole 18 is located in the base 11. One end of the pin 13 can pass through the through hole 8 so as to push the jaws 12 to splay outwards, which has the function of preventing rebound deformation of the clip 1. The through hole 18 and the pin 13 can cooperate. The though hole 18 is in circular shape while the pin 13 is in cylindrical shape corresponding to it. During usage, the pin 13 can pass through the locating hole 17 and be fixed in the through hole 18 at the base 11. Therefore, the situation that the clip 1 fails due to disengaging of the jaws 12 can be prevented.

Third Embodiment

Figure 4:
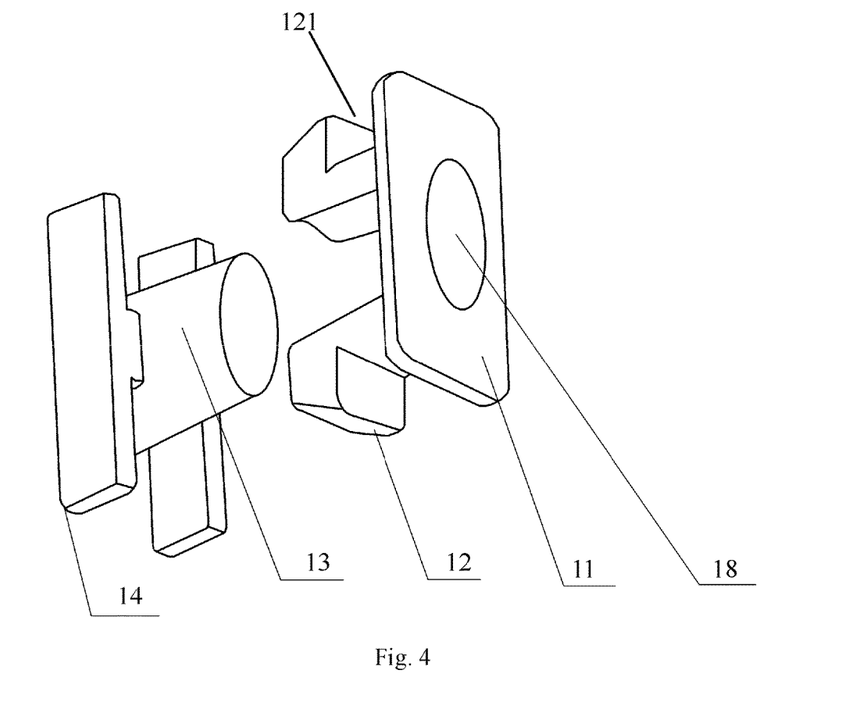
FIG. 4 is a schematic view showing the structure of a clip according to a third embodiment present disclosure.

Similar technical aspect of the third embodiment to the second embodiment will not be described in more detail herein. Some of the aspects of the second embodiment also belong to the aspects of the third embodiment. The difference between the third embodiment and the second embodiment is: a stopper 14 is added to the second embodiment, which not only can ensure that the clip 1 will not rebound deform, but also can stop the jaws 12 so that the appearance after engaging will be smooth and tidy.

Figure 9:
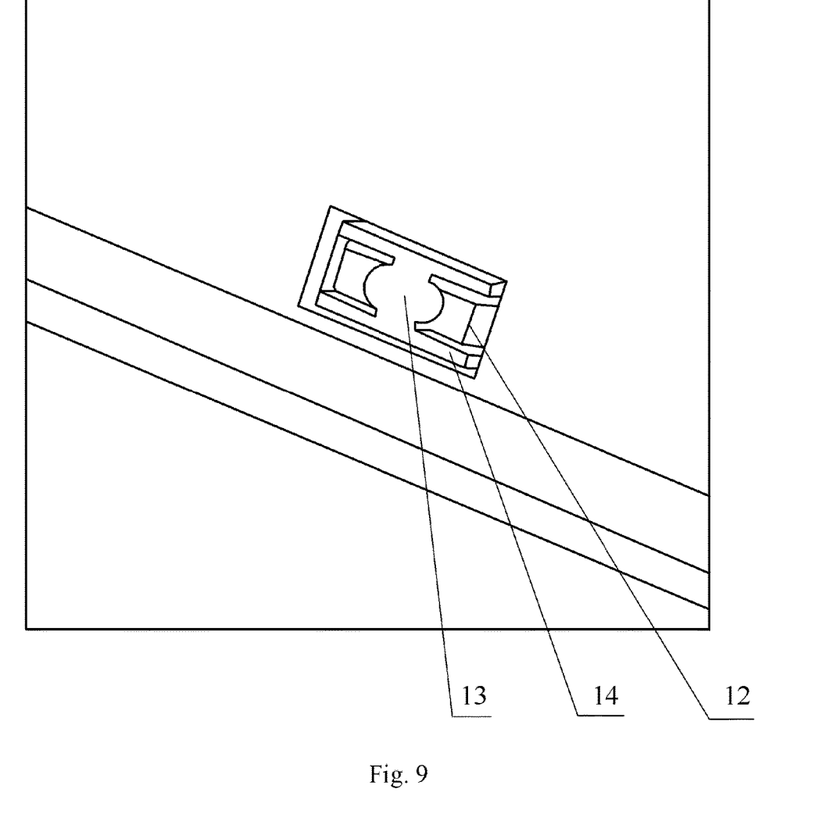
FIG. 9 is a schematic view showing the connection between jaws and a display module in the third embodiment of the present disclosure.
Figure 10:
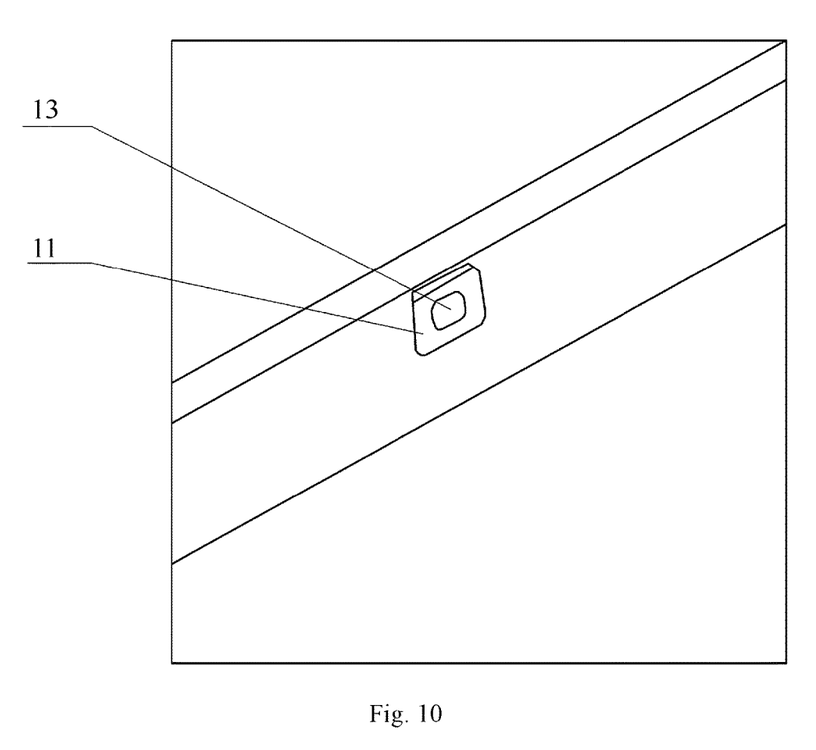
FIG. 10 is a schematic view showing the connection between a base and the display module in the third embodiment of the present disclosure.

As shown in FIG. 4, the clip 1 comprises a base 11, jaws 12, a pin 13 and a stopper 14. A through hole 18 is in the base 11. One end of the pin 13 passes through the through hole 18, while the other end is connected with the stopper 14. The stopper 14 can have baffle plates at two sides of the pin 13. The two baffle plates are disposed parallel to each other. Specifically, as shown in FIG. 9 and FIG. 10, after engaging, the exposed ends of the jaws 12 are disposed between two baffle plates, which can ensure that the overall appearance is smooth and tidy. Meanwhile, the jaws 12 can be stopped so that the disengaging can be further prevented.

Fourth Embodiment

Figure 5:
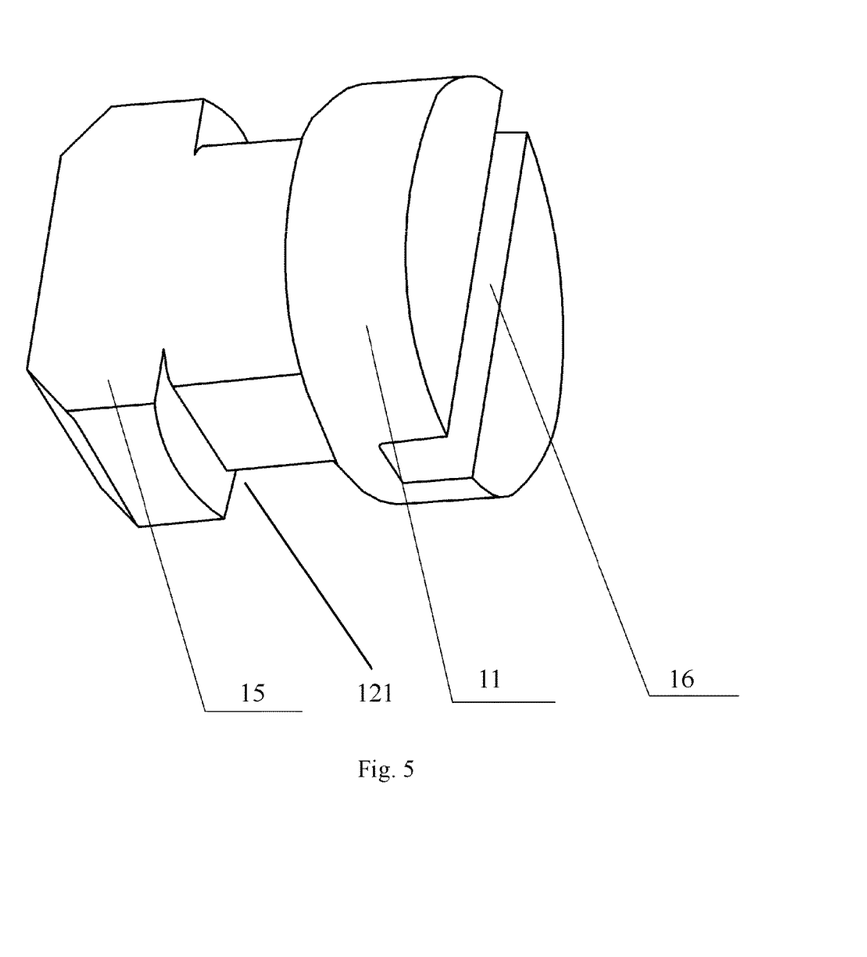
FIG. 5 is a schematic view showing the structure of a clip according to a fourth embodiment of the present disclosure.

The fourth embodiment is further optimized on the basis of the first embodiment: the jaws 12 are replaced with a fixture block 15 having a solid structure. The structure of the fixture block 15 can effectively prevent the situation that the engaging of the jaws 12 fails.

As shown in FIG. 5, the clip 1 comprises a base 11 and a fixture block 15. The fixture block 15 is located at one side of the base 11. A fixture slot is located between the base 11 and the fixture block 15, which is used to engage adjacent two display modules 2. Meanwhile, a locating slot 16 is provided at the other side of the base 11. The locating slot 16 is preferably is straight slot. However, it can take any other forms such as cross slot, During usage, the fixture block 15 is inserted into the locating hole 17; the engaging can be achieved by rotating the locating slot 16 about 90 degree by a straight screwdriver.

Fifth Embodiment

Figure 6:
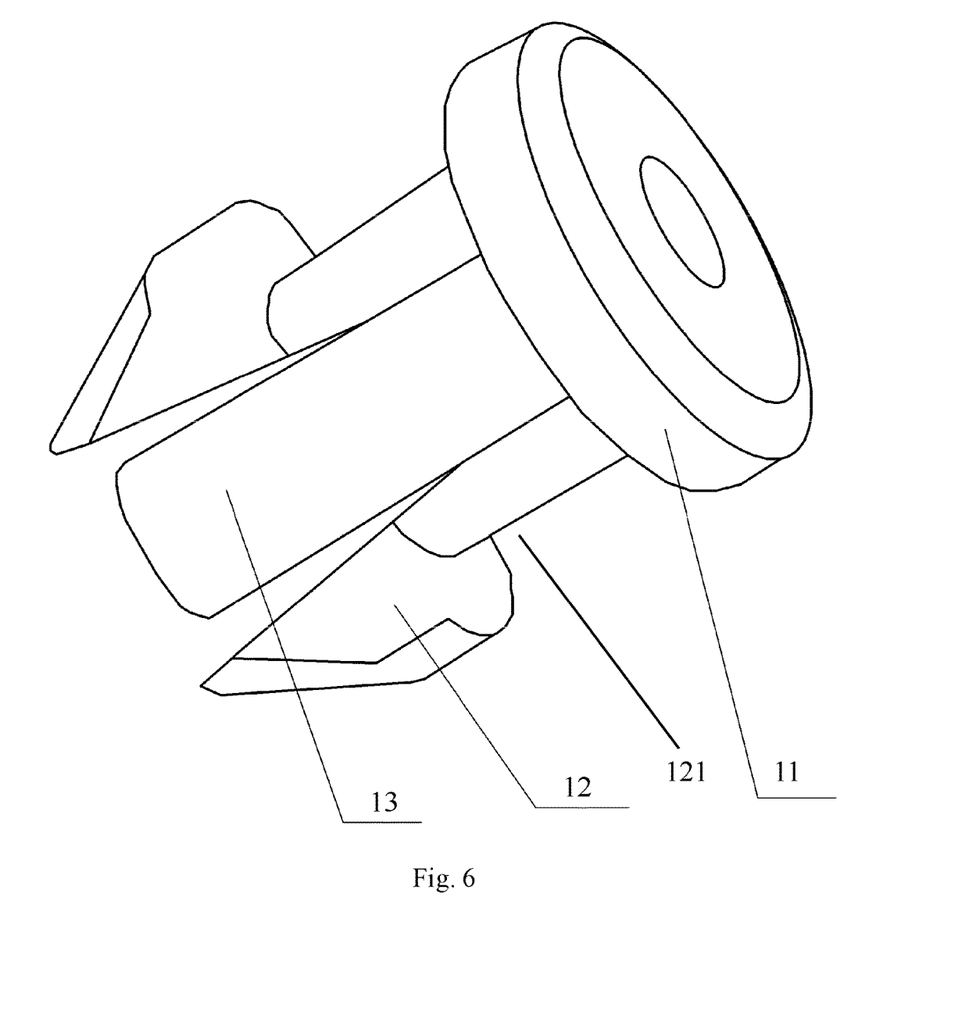
FIG. 6 is a schematic view showing the structure of a clip according to a fifth embodiment of the present disclosure.

The fifth embodiment is further optimized on the basis of the second embodiment: as shown in FIG. 6, the cuboid shape of the base is changed into annular shape, that is, the cross-section shape of the base is annular.

Figure 8:
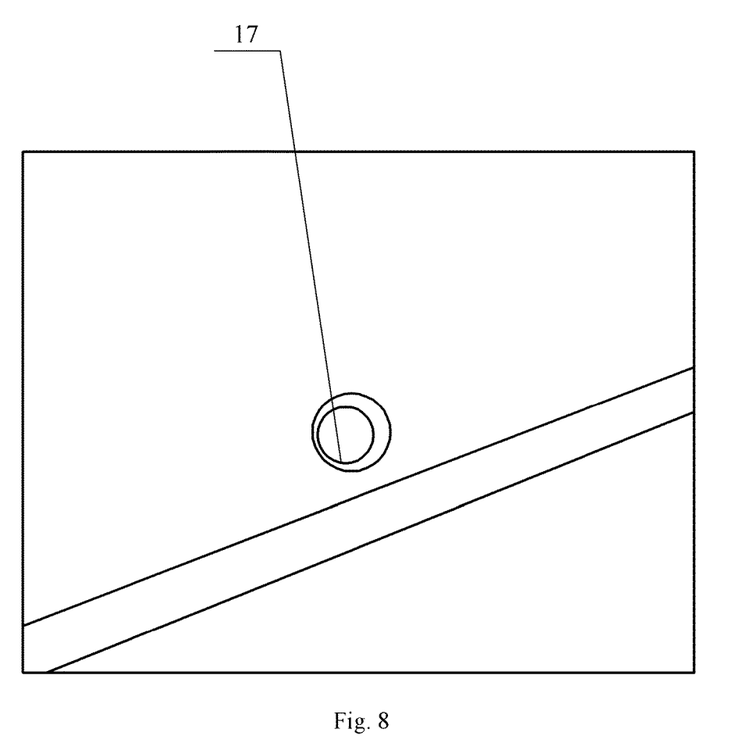
FIG. 8 is a schematic view showing the structure of a locating hole in the fourth embodiment of the present disclosure.

Accordingly, as shown in FIG. 8, the locating hole 17 in circular shape, achieving tight fit. Of course, the cross-section shape of the base 11 can take circular shape or any other shape such as circular shape besides annular shape or rectangular shape.

In addition, the present disclosure provides a display system, which comprises the spliced display and a drive circuit. The drive circuit is used to form image screen on the spliced display.

In summary, in the present spliced display, adjacent two display modules are connected by clips. In the assembling of the display module, the assembling time can be reduced, and the assembling process can be simplified and this is advantageous to the mass production of the products.

The embodiments of the present disclosure are provided for the purpose of illustration and description, and are not exclusive forms of the present disclosure or restrict the present disclosure to the disclosed forms. Various modifications and variations are apparent to those ordinarily skilled in the art. Those embodiments are selected and described in order to better illustrate the principle and practical applications of the present disclosure and those ordinarily skilled in the art can understand the present disclosure and can design various modified embodiments suitable to specific applications.

The invention claimed is:

1. A spliced display, comprising clips and a plurality of display modules, wherein the plurality of display modules are spliced into an image display area, and adjacent display modules are connected by clips, wherein the clips each comprise;
    a base having a through hole;
    jaws extending from the base, the jaws having an engaging portion;
    a fixture slot located between the engaging portion of the jaws and the base, wherein the fixture slot is configured to engage two adjacent display modules;
    a stopper having two opposing baffle plates connected to each other by a connection bar, wherein inner surfaces of the two baffle plates are parallel to each other and are spaced apart from each other to form a gap; and
    a pin extending from the connection bar of the stopper to an end, wherein the end of the pin is configured to be inserted between the laws and through the through hole of the base in a direction from the jaws to the base so that the jaws are stopped by the pin and are housed in the gap formed between the two opposing baffle plates.

2. The spliced display according to claim 1, wherein the number of the jaws is two.

3. The spliced display according to claim 1, wherein the cross-section shape of the base is selected from the group consisting of rectangular, circular, and annular.

4. The spliced display according to claim 1, wherein the display module comprises a transparent liquid crystal panel and a panel frame, the transparent liquid crystal panel is mounted on the panel frame, and a locating hole of the panel frame receives the clip.

5. The spliced display according to claim 1, wherein the fixture slot is a single step fixture slot.

6. A display system comprising:
    a spliced display, the spliced display comprising a plurality of clips and a plurality of display modules, wherein the plurality of display modules are spliced into an image display area, and adjacent display modules are connected by clips, wherein the clips each comprise:
    a base having a through hole;
    jaws extending from the base, the jaws having an engaging portion; and
    a fixture slot located between the engaging portion of the jaws and the base, wherein the fixture slot is configured to engage two adjacent display modules;
    a stopper having two opposing baffle plates connected to each other by a connection bar, wherein inner surfaces of the two baffle plates are parallel to each other and are spaced apart from each other to form a gap; and
    a pin extending from the connection bar of the stopper to an end, wherein the end of the pin is configured to be inserted between the laws and through the through hole of the base in a direction from the jaws to the base so that the jaws are stopped by the pin and are housed in the gap formed between the two opposing baffle plates.

7. The display system according to claim 6, wherein the number of the jaws is two.

8. The display system according to claim 6, wherein the cross-section shape of the base is selected from the group consisting of rectangular, circular, and annular.

9. The display system according to claim 6, wherein the display module comprises a transparent liquid crystal panel and a panel frame, the transparent liquid crystal panel is mounted on the panel frame, and a locating hole of the panel frame receives the clip.

10. The display system according to claim 6, wherein the fixture slot is a single step fixture slot.

* * * * *